Patented Mar. 12, 1940

2,193,033

UNITED STATES PATENT OFFICE 2,193,033

PREPARATION OF CELLULOSE ESTERS

Carl J. Malm and Loring W. Blanchard, Jr., Rochester, N. Y., assignors to Eastman Kodak Company, Rochester, N. Y., a corporation of New Jersey No Drawing. Application September 18, 1937, Serial No. 164,602

3 Claims. (Cl. 260—227)

This invention relates to a process for the production of organic acid esters of cellulose in which the cellulose is pretreated with a solution of phosphoric acid in acetic acid and then esterified by adding acetic anhydride and sulfuric acid catalyst thereto. In the production of high viscosity cellulose acetate it has been necessary to limit the first stage or tetrachlorethane viscosity to at least less than 100 seconds in order to obtain a product which was completely soluble in the reaction mixture to avoid gelling. Cellulose acetates of higher viscosity have been prepared. However, in those cases it has been necessary to incorporate a small amount of propionyl or butyryl into the reaction mixture in order to get a high viscosity product having high clarity.

We have found that this tendency of high viscosity cellulose acetate, especially cellulose acetate having a first stage or tetrachlorethane viscosity of 100 seconds, as well as acetates of lower viscosity may be overcome by employing an acetic acid solution of phosphoric acid to pretreat the cellulose prior to its esterification. We have found that this not only increases the solubility of the cellulose acetate in the esterification bath, thus avoiding gelling, but also facilitates the reaction both by highly activating the cellulose without degrading it and by decreasing the absorption by the cellulose of the acetyl sulfuric acid, which is present in the esterification bath. We have also found that by employing phosphoric acid, the reaction proceeds more smoothly so that the excessive cooling, which has been previously necessary in the initial stages of the reaction, may be avoided.

The three things which mainly contribute to gelling in the preparation of a high viscosity cellulose acetate are, 1. The excessive cooling which is necessary to control the reaction.
2. The limited solvent power of the acetic acid toward cellulose triacetate.
3. Uneven acetylation.

One object of our invention is to so affect these three factors that the gelling in the reaction mixture is substantially eliminated. The first factor is eliminated by the use of phosphoric acid, in that the reaction is milder and proceeds more smoothly than where nothing but acetic acid, acetic anhydride and sulfuric acid catalyst are present in the esterification bath. As for the second factor, the phosphoric acid increases the solvent power of the acetic acid sufficiently so that the triacetate is completely dissolved thereby under the temperature conditions necessary. The third factor is avoided by the high activation of the cellulose by pretreating with a mixture of acetic and phosphoric acids. Another object of our invention is to provide a method in which cellulose of a high cuprammonium viscosity, such as is ordinarily used in the preparation of high viscosity cellulose esters, is readily and evenly activated by the phosphoric acid without degrading the cellulose.

We have found that an acetic acid solution of phosphoric acid exhibits a marked swelling action on cellulose which contributes to the smoothness and uniformity of the subsequent esterification.

Our invention is employed by treating cellulose, such as cotton linters or refined wood pulp, having a comparatively high cuprammonium viscosity, with an acetic acid solution of phosphoric acid, preferably under the usual pretreatment conditions. The pretreatment liquid may contain large quantities of phosphoric acid. It may be a solution in which only a minor amount of phosphoric acid is present or a solution having approximately 20–30% phosphoric acid, based on the weight of the acetic acid.

It is preferred for economic reasons that not more than a 30% solution of phosphoric acid be used, but this concentration depends of course upon the ratio of liquid to cellulose employed.

It is to be understood that the activating ability of the pretreatment solution does not increase above 30% concentration of phosphoric acid. After pretreatment the mass is subjected to the action of acetic anhydride, using a sulfuric acid catalyst with or without the addition of further acetic acid or other solvent, such as ethylene or methylene chloride. Prior to the addition of the esterifying reagents, which are preferably cooled, the mass is subjected to cooling so that the temperature does not rise to a point which will result in too great a reduction in viscosity, as otherwise the desired high viscosity cellulose ester will not result.

The temperature will, as a rule, be maintained at not more than 100° F., although this will depend upon the proportion of sulfuric acid present. As is commonly recognized, as the amount of sulfuric acid present, based on the weight of the cellulose, is decreased the higher is the temperature permissible without reducing viscosity.

The physical procedure used in the pretreatment of the cellulose in accordance with our invention may be carried out in accordance with the process described and claimed in Malm application Serial No. 81,323. Example II illustrates a process in accordance with our invention in which a pretreatment in accordance with that Malm application is employed. The following examples illustrate the application of our invention to processes of preparing high viscosity cellulose esters:

*Example I*

500 lbs. of refined cotton linters, having a high cuprammonium viscosity, were treated with a mixture of 1000 lbs. of acetic acid and 40 lbs. of 85% phosphoric acid for 4 hours at 100° F. 2200 lbs. of acetic acid was then added and the mixture was cooled to 65° F. A mixture of 1400 lbs. of 85% acetic anhydride and 32 lbs. of 98% sulfuric acid was added and the reaction was allowed to proceed up to a maximum temperature of 100° F. The dope which was obtained was free from haze and extremely viscous. To hydrolyze the ester, 850 lbs. of 50% acetic acid was added thereto and the mass was kept at 100° F. until the cellulose ester had an acetyl content of 39%. The cellulose ester was then precipitated, washed with pure water and dried. The transparency of the hydrolysis mixture before precipitation was determined and it was found to be possible to see through 22 cm. of the solution. Similar reactions were carried out, except that in one case the phosphoric acid was omitted and in the other case, it was added with the sulfuric acid in the esterification proper rather than in the pretreatment. Transparency of those solutions was determined and it was found that it was possible to see through only 7–8 cm. of the solution or dope of the ester formed.

*Example II*

500 lbs. of refined sulfite pulp, having a high alpha cellulose content in sheeted form, was passed over a roll rotated in acetic acid, containing 20% phosphoric acid. The sheet absorbed 140 lbs. of the pretreatment acid mixture. The sheet was then wound tightly and allowed to stand in an enclosed container at room temperature for about 24 hours. The sheet was then fed into an acetylation mixer containing 3060 lbs. of acetic acid, 1400 lbs. of acetic anhydride and 8000 cc. of sulfuric acid. This mixture had been cooled to 50° F. prior to introducing the cellulose sheet. The reaction was allowed to proceed to a maximum temperature of 100° F. In 4–5 hours a highly viscous dope of excellent clarity was obtained. This ester was then hydrolyzed, precipitated and washed in the customary way.

If desired, the activating treatment of Example II can be carried out by passing the cellulose sheet over drying rolls before passing it over the roll moistened with the acetic acid—phosphoric acid mixture. This will bring down the moisture content of the sheet and heat it to a temperature above 100° F. If desired, the acetic acid mixture may also be kept above 100° F. by passing steam through the applying roll or by placing steam coils in the vat containing the acid mixture. If the temperature of pretreatment is kept at or above 100° F., a shorter pretreatment time, such as 6 hours or even less, is sufficient.

Although the cuprammonium viscosity of the cellulose, employed as the starting material in the preparation of esters in accordance with our invention, is preferably high, nevertheless, our invention may be made use of in the preparation of esters in which cellulose, having a more moderate cuprammonium viscosity, is used. As the process, which we have described, has substantially no degrading effect upon the cellulose or the ester prepared therefrom, a satisfactory cellulose ester may be prepared using a medium viscosity cellulose. If a high viscosity cellulose is employed it might even be desirable to lower this viscosity before the acetylation. This can be accomplished by adding a small amount of sulfuric acid to the pretreatment mixture toward the end of the pretreatment or during the cooling before the acetylation.

In the preparation of high viscosity esters, in accordance with our invention, it is desirable that there be at least 3 parts of the esterification bath to every part of cellulose therein and that the proportion of sulfuric acid, which is used, be above 4%. It is also desirable that an esterification temperature be used which will not degrade the cellulose during the esterification and drop the tetrachlorethane-acetic acid first stage viscosity too much.

Our invention, although adapted for the preparation of cellulose acetates, particularly those of high viscosity, due to the difficulties met with in their preparation, it is also available in the preparing of other lower fatty acid esters of cellulose, such as cellulose acetate propionate or cellulose acetate butyrate. The swelling action of the phosphoric acid renders the cellulose readily esterifiable and makes for a smooth esterification without danger of degrading the cellulose.

Due to the extraordinary clarity of the solutions of esters prepared in accordance with our invention, these esters are especially adapted for the manufacture of products in which high transparency is of importance, such as in the making of photographic film or laminated glass. They may, however, be used in other connections, such as in the making of synthetic yarn or for coating fabrics or for transparent sheeting, such as to be employed for wrapping purposes.

We claim:

1. The process for preparing organic acid esters of cellulose which comprises pretreating the cellulose with a mixture of acetic acid and a minor proportion of phosphoric acid as the sole activating agent at a temperature between approximately 70° F. and approximately 100° F., thereby avoiding degradation of the cellulose, and subsequently esterifying the cellulose by adding a fatty acid anhydride and sulfuric acid as the catalyst to the mass.

2. The process for preparing organic acid esters of cellulose which comprises pretreating the cellulose with a mixture of acetic acid and 20–30% of phosphoric acid as the sole activating agent at a temperature of approximately 100° F., thereby avoiding degradation of the cellulose, and subsequently esterifying the cellulose by adding a fatty acid anhydride and sulfuric acid as the catalyst to the mass.

3. The process for preparing cellulose acetate which comprises pretreating cellulose with a mixture of acetic acid and a minor proportion of phosphoric acid as the sole activating agent at a temperature between approximately 70° F. and approximately 100° F., thereby avoiding degradation of the cellulose, and subsequently acetylating the cellulose by adding acetic anhydride and sulfuric acid catalyst to the mass.

CARL J. MALM.
LORING W. BLANCHARD, JR.